3,050,513
PROCESS AND CATALYST FOR PRODUCTION
OF RUBBERY POLYMERS
Robert P. Zelinski and David R. Smith, Bartlesville, Okla., assignors to Phillips Petroleum Company, a corporation of Delaware
No Drawing. Filed Apr. 20, 1956, Ser. No. 579,429
17 Claims. (Cl. 260—94.3)

This invention relates to a method for polymerizing 1,3-butadiene or isoprene and to a novel catalyst composition therefor. In one aspect, the invention relates to a novel polymer of 1,3-butadiene. In still another aspect, the invention relates to a novel polymer of isoprene.

Various methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,3-addition, the remainder being cis and trans 1,4-addition. When potassium and other alkali metals are employed as catalysts, the latter ratios may vary to some degree, but no polybutadiene containing more than about 35 percent of cis 1,4 configuration has been obtained. Alfin-catalyzed polybutadiene has from about 65 to about 75 percent trans 1,4-addition, from about 5 to about 10 percent cis 1,4-addition, and from about 20 to about 25 percent 1,2-addition. For a more complete discussion of the configuration of polybutadiene, reference is made to an article by J. L. Binder appearing in Industrial and Engineering Chemistry, vol. No. 46, 1727 (August 1954). We have discovered that novel polymers of 1,3-butadiene and isoprene having a unique structure can be produced by proceeding in accordance with the instant invention.

It is an object of this invention to provide a novel method for polymerizing 1,3-butadiene or isoprene to produce polymers which have a novel configuration.

Another object of the invention is to provide a novel catalyst system for use in the polymerization of 1,3-butadiene or isoprene.

A further object of the invention is to provide a method for polymerizing 1,3-butadiene to produce linear, soluble polymers.

A still further object of the invention is to provide a polybutadiene having between 70 and 90 percent trans 1,4-addition and not more than 10 percent 1,2-addition, the remainder being cis 1,4-addition.

Another object of the invention is to provide a method for polymerizing isoprene to produce linear, soluble polymers.

Still another object of the invention is to provide a polyisoprene with up to about 95 percent trans 1,4-addition.

Other and further objects and advantages of the invention will become apparent to one skilled in the art upon consideration of the accompanying disclosure.

It has now been discovered that novel and unique polymers of certain conjugated dienes, namely, 1,3-butadiene and isoprene, are obtained when one or the other of these monomers is polymerized in the presence of a catalyst composition comprising (a) a complex aluminum hydride of an alkali metal, and (b) titanium tetraiodide. The polybutadiene produced by the process of this invention is a rubbery polymer with from about 70 to 90 percent trans 1,4-addition and up to and including 10 percent 1,2-addition, the remainder being cis 1,4-addition. The polyisoprene produced by this process is also a rubbery polymer with from about 75 to 95 percent trans 1,4-addition with the remainder being 3,4-addition, 1,2-addition and cis 1,4-addition and with a major proportion of the remainder being 3,4-addition.

The complex aluminum hydride employed in our catalyst system with titanium tetraiodide can be represented by the formula $MAlH_4$, wherein M is a metal selected from the group consisting of lithium, sodium, potassium, rubidium and cesium. The catalyst system which it is preferred to employ in the practice of our invention consists essentially of lithium aluminum hydride and titanium tetraiodide. It is, of course, to be understood that minor amounts of other materials which have no catalytic effect may be included in the system without departing from the spirit or scope of the invention.

The amount of complex aluminum hydride used in the catalyst composition of this invention is usually in the range of 0.5 to 6 mols per mol of titanium tetraiodide. However, a preferred ratio is from 1.3 to 3.0 mols of complex aluminum hydride per mol of titanium tetraiodide. It has been found that greatly increased yields of the polymer product are obtained when using a catalyst composition falling within the preferred ratio.

The catalyst system of this invention appears to be unique in several respects, particularly with regard to the unexpected results obtained. Firstly, the polybutadiene and polyisoprene formed in the presence of the instant catalyst system appear to have a novel structure. Thus, the polybutadiene obtained has from 70 to 90 percent trans 1,4-addition and not more than 10 percent 1,2-addition, with the remainder being cis 1,4-addition. Insofar as is known, the literature contains no description of a polymer which has this relatively high amount of trans 1,4-addition while at the same time having not more than 10 percent 1,2-addition. The polyisoprene has up to 95 percent trans 1,4-addition, and there appears to be in the literature no description of a polymer of isoprene which has this structure. Furthermore, halides of titanium other than titanium tetraiodide when used in catalyst systems to polymerize 1,3-butadiene or isoprene do not produce polymers which have the structure of the polymers of this invention. Accordingly, the instant catalyst system appears to be in a category by itself insofar as the production of the novel polymers of this invention are concerned.

The polybutadiene and polyisoprene produced in accordance with this invention are rubbery polymers. The term "rubbery polymer" includes elastomeric, vulcanizable polymeric material which after vulcanization, i.e., cross-linking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery polymers produced in accordance with this invention are essentially linear, soluble polymers. With regard to the solubility of the rubbery polymers of this invention, they contain substantially no gel as determined by the standard gel determination test. The below described procedure is followed in carrying out this test. If the gel content is expected to be below 50 percent, the sample of polymer to be tested for gel should weigh from 0.10 to 0.13 gram while if the gel content is expected to be above 50 percent, a sample weighing from 0.13 to 0.18 is used. The sample is placed in a cage of calibrated weight, fabricated from 80-mesh 18–8 stainless steel screen. The cage containing the polymer is then placed in a 4-ounce wide mouth bottle into which 100 milliliters of reagent grade benzene is pipetted. The bottle is then capped tightly with a threaded cap, fitted with a cardboard gasket and protected with a circle of aluminum foil. The bottle is then placed in the dark and allowed to stand at room temperature for at least 24 hours and preferably not more than 48 hours. No shaking or stirring of the contents is permissible during this dissolution period. At the end of this period, the cage is withdrawn from the bottle and placed in a wide mouth 2-ounce bottle. The weight of the gel which is adhering to the cage is calculated and expressed as swelled gel. The cage containing the gel is then dried in a vacuum oven maintained at a temperature between 70 and 80° C. after which the weight of dry gel is determined. The gel is then calculated as the weight percent of the rubbery polymer which is insoluble in benzene. The swelling index is determined as the weight ratio of swelled gel to dry gel.

The polybutadiene and polyisoprene of this invention are substantially completely soluble in benzene at room temperature. The transition point, sometimes referred to as melting point, of the polymers is, in general, below 75° C. In the case of polybutadiene, the transition point is usually between 60 and 65° C. The term "transition point," as used herein, can be defined as that temperature at which the polymer changes in appearance from a translucent polymer to a transparent polymer. The polybutadiene and polyisoprene are rubbery at room temperature and on heating to above the transition point become more plastic and pliable in nature. The polymers are believed to be of a low order of crystallinity when recovered initially from the polymerization reactor. When the polymers are heated to temperatures above their transition points, they apparently become amorphous at these temperatures.

The polymerization method of this invention can be carried out at any temperature within the range of zero to 150° C., but it is preferred to operate in the range of 10° C. to 80° C. It is preferred to carry out the polymerization in the presence of an inert hydrocarbon diluent, although the polymerization can be carried out without the use of such diluent. The polymerization reaction can be carried out under autogenous pressure or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The amount of the catalyst of this invention which is used in the polymerization of 1,3-butadiene or isoprene can vary over a relatively wide range. However, the concentration of the total catalyst composition is usually in the range of about 0.10 weight percent to 10 weight percent, or higher, preferably in the range of 0.25 weight percent to 7.0 weight percent, based on the total amount of polymerizable monomer charged to the polymerization reactor. It has been found that when operating at high catalyst levels and with high mol ratios of complex aluminum hydride to titanium tetraiodide, there is a tendency sometimes to form a polymer which contains some gel. When employing high catalyst levels, it is, therefore, frequently desirable to operate with lower mol ratios so as to provide polymers which are substantially gel-free.

Diluents suitable for use in the polymerization process are hydrocarbons which are not detrimental to the polymerization reaction and which are liquid under reaction conditions of the process. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in the practice of the process of this invention. Cycloparaffins, such as cyclohexane, can also be used although they are less desirable than the other diluents. Furthermore, mixtures of any of the aforementioned hydrocarbons can be used as diluents.

When practicing the process of this invention, it is frequently preferred to charge the complex aluminum hydride to the reactor as a solution. Suitable solvents for the complex aluminum hydride include ethers, e.g., dialkyl ethers, such as diethyl ether, and cyclic ethers, such as dioxane and tetrahydrofuran. In some cases at least, it seems that a complex of the complex aluminum hydride is formed when it is added to the solvent. For example, when diethyl ether is utilized as a solvent, it appears that an etherate of lithium aluminum hydride is formed. However, it is to be understood that the complex aluminum hydride and the titanium tetraiodide, either individually or as a mixture, can be charged to the reactor in solid form. When added as solids, it is preferred that these materials be in the form of a powder having very small particle size. In carrying out the process at lower temperatures, e.g., below room temperature, it is frequently preferred to age the mixture of diluent and catalyst components, e.g., at 30 to 100° C. for 10 minutes to 24 hours or longer, before contacting these materials with the monomer.

The process of this invention can be carried out in a conventional batch operation or continuous operation. When operating as a batch process, the diluent and catalyst components are added to the reactor prior to addition of the conjugated diene. During the course of the polymerization, additional polymerizable monomer and/or catalyst components and/or diluent can be added at intervals as desired. Upon completion of the particular polymerization run, the entire reaction mixture can be treated to inactivate the catalyst, purify the polymer, etc.

When operating in a continuous manner, the diluent, catalyst components, and conjugated diene are added to a reaction zone at a relatively constant rate, and a corresponding amount of reaction mixture is removed from the zone at a relatively constant rate. This reaction zone may be a single vessel provided with a means for agitating the reaction mixture in order to provide as homogeneous a mixture as possible. Also, if desired, several such reaction vessels can be employed in series with the effluent from the first vessel passing to the second vessel, etc. Additional monomer, diluent, and catalyst components can be added, if desired, to any of the subsequent vessels. It is also within the scope of the invention to employ a so-called tubular reactor in which the conversion gradient will vary from essentially zero at the inlet end to the maximum at the outlet end. Additional catalyst, monomer, and diluent can be added, if desired, at points intermediate the inlet and outlet ends of this type of reactor.

The residence time in a continuous process will, of course, vary within rather wide limits depending upon such variables as temperature, pressure, the ratio of catalyst components, and catalyst concentration. In a continuous process, the residence time will generally fall within the range of one second to 24 hours when conditions within the specified ranges are employed. When a batch process is being employed, the time for the reaction can be as high as 24 hours or more.

Various materials are known to be destructive to the catalyst composition of this invention. These materials include carbon dioxide, oxygen and water. It is highly desirable, therefore, that the 1,3-butadiene be free of these materials, as well as other materials which tend to inactivate the catalyst. Any of the known means for removing such contaminants can be used. Also, when a diluent is employed in the process, it is preferred that this material be substantially free of impurities such as water, oxygen, and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. Thus, it has been found that satisfactory polymerization rates can be obtained when as much as 500 to 1000 parts of water per 1,000,000 parts of reactor charge are present in the reactor. It is to be understood, however, that the amount of water which may be tolerated in the reaction mixture is insufficient to completely deactivate the catalyst.

At the completion of the polymerization reaction, when a batch process is used, the total reaction mixture is then treated to inactivate the catalyst and precipitate the rubbery polymer, as by adding an alcohol. The polymer is then separated from the alcohol and diluent by any suitable means, such as decantation or filtration. In order to purify the rubbery polymer, the separated polymer can be redissolved in a suitable diluent and then again precipitated by the addition of an alcohol. The polymer is again separated, as indicated hereinbefore, and then dried. Any of the diluents listed hereinabove can be used in this purification step to redissolve the polymer. When the process of the invention is carried out continuously, the total effluent from the reactor is pumped from the reactor to a catalyst-inactivating zone where the reactor effluent is contacted with a suitable catalyst-inactivating material, such as an alcohol. When an alcohol is used as the catalyst-inactivating material it also acts to precipitate the polymer. In the event other catalyst-inactivating materials are employed which do not perform this dual function, it is also necessary to add a suitable material, such as an alcohol, to precipitate the polymer. The diluent and alcohol are then separated from the polymer by filtration or other suitable means and then dried. The rubbery polymer can also be redissolved in a suitable diluent and again precipitated, as described above, in order to purify the material. The diluent and alcohol can be separated, for example by fractional distillation, and reused in the process. It is also within the scope of the invention to utilize an anti-oxidant, such as phenyl-beta-naphthylamine, in the process of this invention to prevent oxidation of the rubbery polymer. The anti-oxidant can be added to the reaction mixture prior to precipitation of the polymer, to the solution of redissolved polymer, or to the diluent in which the polymer is to be subsequently redissolved.

The rubbery polymers which result when 1,3-butadiene or isoprene is polymerized by the method of this invention can be compounded and vulcanized in a manner similar to that which is employed for commercially available synthetic or natural rubber. Vulcanization accelerators, reinforcing agents, and fillers such as have been employed previously can likewise be employed when compounding the polymers of this invention.

A more comprehensive understanding of the invention can be obtained by referring to the following illustrative examples which are not intended, however, to be unduly limitative of the invention.

EXAMPLE I

Several runs were made in which 1,3-butadiene was polymerized to rubbery polymer by a catalytic polymerization employing a catalyst system comprising lithium aluminum hydride and titanium tetraiodide. These runs were carried out in accordance with the following procedure.

Benzene was charged to a one-quart beverage bottle, after which an amount of titanium tetraiodide was charged to the bottle. Following this charge, an amount of lithium aluminum hydride was charged to the bottle after which an amount of 1,3-butadiene was charged to the bottle. The lithium aluminum hydride was charged as a 1.14 molar solution in diethyl ether. During the charging of the catalyst components and the butadiene, the vapor space in the bottle was continuously flushed with nitrogen. After these materials were charged, the bottle was sealed with a neoprene seal and a crown bottle cap which was punched so as to expose a portion of the neoprene seal. The bottle was then placed in a constant temperature bath and tumbled in this bath for a certain period of time. At the end of this time, the bottle was removed, and the contents of the bottle were dumped into one liter of isopropyl alcohol. The resulting mixture was then stirred vigorously. The polymer which was present precipitated, and this rubbery polymer was removed and dried in a vacuum oven. The yield of polymer and the percent conversion were then calculated.

The polymer was then tested to determine its gel content by the standard gel determination test which has been described hereinbefore. The solution of polymer in benzene which results when the polymer is dissolved in this test is measured to determine its viscosity, and this viscosity is considered to be the inherent viscosity of the polymer. In measuring inherent viscosity by this method, it should be noted that this does not include that portion of the polymer which is insoluble (gel).

The above-described runs were carried out according to the following polymerization recipes.

*Recipes*

|  | Parts by weight | |
| --- | --- | --- |
|  | A | B |
| Butadiene | 100 | 100 |
| Benzene | 440 | Variable |
| Lithium aluminium hydride | Variable | 0.433 |
| Titanium tetraiodide | Variable | Variable |
| Temperature, °C | 50 | 50 |
| Time, hours | 17–18 | 18 |

In the runs which were carried out according to the above-described procedure and polymerization recipes, the amount of each of the individual catalyst components was varied so as to vary the mol ratio of the lithium aluminum hydride to the titanium tetraiodide. The results of these runs are presented below in Table I.

TABLE I

| Run No. | Recipe | LiAlH₄/TTI mol ratio | TTI Parts by weight | TTI Mmole | LiAlH₄ Parts by weight | LiAlH₄ Mmole | Weight Percent catalyst based on monomer | Benzene parts by weight in recipe B | Conv., percent | Inherent viscosity |
|---|---|---|---|---|---|---|---|---|---|---|
| 1 | A | 0.64 | 5.7 | 10.3 | 0.251 | 6.6 | 5.95 | | 19 | 1.42 |
| 2[1] | A | 0.86 | 5.7 | 10.3 | 0.334 | 8.8 | 6.03 | | 81 | 1.50 |
| 3 | A | 1.26 | 3.0 | 5.4 | 0.26 | 6.8 | 3.26 | | | |
| 4 | A | 1.33 | 2.8 | 5.1 | 0.26 | 6.8 | 3.06 | | [2]43 | 2.18 |
| 5 | A | 1.31 | 2.9 | 5.2 | 0.26 | 6.8 | 3.16 | | | |
| 6[1] | A | 1.31 | 5.6 | 10.1 | 0.502 | 13.2 | 6.1 | | 91 | 1.03 |
| 7 | A | 1.34 | 4.3 | 7.8 | 0.388 | 10.2 | 4.69 | | 100 | 1.60 |
| 8 | A | 1.36 | 3.12 | 5.62 | 0.290 | 7.64 | 3.41 | | 96 | ([3]) |
| 9 | A | 1.46 | 4.3 | 7.8 | 0.433 | 11.4 | 4.73 | | 21 | 1.40 |
| 10 | A | 1.56 | 6.3 | 11.3 | 0.668 | 17.6 | 6.97 | | 86 | 0.60 |
| 11 | A | 1.58 | 4.6 | 8.3 | 0.497 | 13.1 | 5.10 | | 99 | 0.41 |
| 12 | A | 1.74 | 4.7 | 8.5 | 0.562 | 14.8 | 5.26 | | 98 | ([3]) |
| 13 | A | 1.95 | 4.0 | 7.2 | 0.532 | 14.0 | 4.53 | | 93 | ([3]) |
| 14 | A | 2.92 | 4.1 | 7.38 | 0.82 | 21.6 | 4.92 | | 83 | ([3]) |
| 15 | A | 3.08 | 2.2 | 3.96 | 0.25 | 6.8 | 2.45 | | 95 | 1.06 |
| 16 | A | 4.83 | 2.3 | 4.14 | 0.76 | 20 | 3.06 | | 79 | ([3]) |
| 17 | B | 1.67 | 3.8 | 6.84 | 0.433 | 11.4 | 4.23 | 660 | 64 | ([3]) |
| 18 | B | 1.76 | 3.6 | 6.48 | 0.433 | 11.4 | 4.03 | 440 | 97 | ([3]) |
| 19 | B | 1.81 | 3.5 | 6.30 | 0.433 | 11.4 | 3.93 | 880 | | ([3]) |
| 20 | B | 1.87 | 3.4 | 6.12 | 0.433 | 11.4 | 3.83 | 1,120 | 21 | ([3]) |

[1] See Example IV for infrared analysis of the polymer of these runs. None of the runs tabulated above produced gel.
[2] Average.  [3] Not measured.

EXAMPLE II

Several runs were made in which 1,3-butadiene was polymerized to rubbery polymer by the procedure of Example I. These runs were carried out according to the following polymerization recipes.

*Polymerization Recipes*

| | Parts by weight A | Parts by weight B | Parts by weight C |
|---|---|---|---|
| Butadiene | 100 | 100 | 100 |
| Benzene | 440 | 440 | 440 |
| LiAlH₄ | Variable | Variable | [1]0.456 |
| TTI | Variable | Variable | [2]5.5 |
| Temperature, °C | 30 | 50 | 50 |
| Time, hours | 18 | Variable | 24 |

[1] 12 mole.  [2] 10 mole.

NOTE.—The results of these runs are presented below as Table II.

EXAMPLE III

A series of runs was made in which isoprene was polymerized to rubbery polymer by the same procedure employed to polymerize 1,3-butadiene in Example I. These runs were carried out according to the following polymerization recipe.

*Recipe*

| | Parts by weight A | Parts by weight B |
|---|---|---|
| Isoprene | 100 | 100 |
| Benzene | 440 | 440 |
| LiAlH₄ | Variable | Variable |
| Titanium tetraiodide (TTI) | Variable | [1]5.5 |
| Temperature, °C | 50 | 30 |
| Time, hours | 24 | 24 |

[1] 10 mole.

NOTE.—The results of these runs are presented below as Table III.

TABLE II

| Run No. | Recipe | LiAlH₄/TTI mol ratio | TTI Parts by weight | TTI Mmole | LiAlH₄ Parts by weight | LiAlH₄ Mmole | Weight Percent catalyst based on monomer | Time, hours in recipe B | Conv., percent | Inherent viscosity |
|---|---|---|---|---|---|---|---|---|---|---|
| 21 | A | 1.58 | 2.78 | 5.0 | 0.30 | 7.9 | 3.08 | | 76 | ([1]) |
| 22 | A | 1.71 | 3.06 | 5.5 | 0.369 | 9.7 | 3.43 | | 98 | ([1]) |
| 23 | A | 1.97 | 3.0 | 5.4 | 0.403 | 10.6 | 3.40 | | 97 | ([1]) |
| 24 | A | 1.2 | 5.5 | 10.0 | 0.456 | 12.0 | 5.96 | | 86 | 0.61 |
| 25 | B | 1.36 | 2.8 | 5.04 | 0.260 | 6.84 | 3.06 | 2 | 24 | ([1]) |
| 26 | B | 1.33 | 3.8 | 6.84 | 0.347 | 9.12 | 4.15 | 3 | 91 | ([1]) |
| 27 | B | 1.37 | 3.0 | 5.40 | 0.281 | 7.40 | 3.28 | 4.5 | 42 | ([1]) |
| 28 | B | 1.30 | 3.1 | 5.68 | 0.281 | 7.40 | 3.38 | 5 | 94 | ([1]) |
| 29 | B | 1.40 | 4.1 | 7.38 | 0.391 | 10.3 | 4.49 | 6 | 95 | ([1]) |
| 30 | B | 1.37 | 3.7 | 6.66 | 0.347 | 9.12 | 4.05 | 6.75 | 97 | ([1]) |
| 31 | B | 1.00 | 3.85 | 7.0 | 0.266 | 7.0 | 5.11 | 24 | 89 | 1.24 |
| 32[2] | C | 1.2 | 5.5 | 10.0 | 0.456 | 12.0 | 5.96 | | 86 | 0.54 |

[1] Not measured.
[2] The infrared analytical data for these runs are given in Example IV. Run 24 above was carried out according to recipe A except that the reaction time was 24 hours instead of 18 hours as stated in the recipe.

NOTE.—In the above table, there was no gel present in the runs in which the inherent viscosity was measured; in the other runs gel determinations were not made.

TABLE III

| Run No. | Recipe | LiAlH₄/TTI mol ratio | TTI Parts by weight | TTI Mmole | LiAlH₄ Parts by weight | LiAlH₄ Mmole | Weight percent catalyst based on monomer | Conversion, percent | Inherent viscosity |
|---|---|---|---|---|---|---|---|---|---|
| 33 | A | 0.8 | 2.22 | 4.0 | 0.122 | 3.2 | 2.34 | 80 | (¹) |
| 34 | A | 0.8 | 5.5 | 10.0 | 0.304 | 8.0 | 5.80 | 62 | 0.79 |
| 35 | A | 1.0 | 3.30 | 6.0 | 0.228 | 6.0 | 3.53 | 68 | 1.05 |
| 36 | A | 1.0 | 5.5 | 10.0 | 0.380 | 10.0 | 5.88 | 63 | 0.61 |
| 37 | A | 1.2 | 1.07 | 2.0 | 0.095 | 2.4 | 1.17 | 83 | (¹) |
| 38 ² | A | 1.2 | 1.64 | 3.0 | 0.137 | 3.6 | 1.78 | 19 | (¹) |
| 39 | A | 1.2 | 2.23 | 4.0 | 0.182 | 4.8 | 2.41 | 67 | (¹) |
| 40 | A | 1.2 | 3.32 | 6.0 | 0.273 | 7.2 | 3.59 | 83 | 0.75 |
| 41 ² | A | 1.4 | 1.63 | 3.0 | 0.160 | 4.2 | 1.79 | 46 | (¹) |
| 42 | A | 1.4 | 3.35 | 6.0 | 0.319 | 8.4 | 3.67 | 86 | 0.69 |
| 43 | A | 1.4 | 5.5 | 10.0 | 0.532 | 14.0 | 6.03 | 46 | 0.44 |
| 44 ² | A | 1.6 | 1.66 | 3.0 | 0.182 | 4.8 | 1.84 | 80 | (¹) |
| 45 | A | 1.6 | 2.26 | 4.0 | 0.243 | 6.4 | 2.50 | 91 | (¹) |
| 46 ² | A | 1.8 | 1.68 | 3.0 | 0.205 | 5.4 | 1.89 | 70 | (¹) |
| 47 ² | A | 1.8 | 1.65 | 3.0 | 0.205 | 5.4 | 1.86 | 31 | (¹) |
| 48 ² | A | 2.0 | 1.64 | 3.0 | 0.228 | 6.0 | 1.87 | 41 | (¹) |
| 49 ² | A | 2.2 | 1.62 | 3.0 | 0.251 | 6.6 | 1.87 | 58 | (¹) |
| 50 ² | A | 2.4 | 1.67 | 3.0 | 0.274 | 7.2 | 1.94 | 57 | (¹) |
| 51 ² | A | 2.5 | 1.65 | 3.0 | 0.285 | 7.5 | 1.94 | 74 | (¹) |
| 52 ² | A | 3.0 | 1.62 | 3.0 | 0.342 | 9.0 | 1.96 | 25 | (¹) |
| 53 | B | 1.0 | 5.5 | 10.0 | 0.380 | 10.0 | 5.88 | 66 | (¹) |
| 54 | B | 1.2 | 5.5 | 10.0 | 0.456 | 12.0 | 5.97 | 47 | (¹) |
| 55 | B | 1.4 | 5.5 | 10.0 | 0.532 | 14.0 | 6.03 | 52 | (¹) |

¹ Not measured.   ² Infrared analyses for these runs given in Example IV.

NOTE.—No gel was present in any of the runs in which the inherent viscosity was measured; in the other runs gel determinations were not made.

EXAMPLE IV

A number of the polymers produced in the polymerization runs described in the preceding examples were examined by infrared analysis. This work was carried out to determine the percentage of the polymer formed by trans 1,4-addition, cis 1,4-addition, 1,2-addition, and 3,4-addition of the monomer.

In these runs, the polymers were dissolved in carbon disulfide to form a solution having approximately 20 grams of polymer per liter of solution. The infrared spectrum of each of the solutions (percent transmission) was then determined in a commercial infrared spectrometer.

In the runs in which polybutadiene was analyzed by infrared transmission, the percent of the total unsaturation present as trans 1,4- was calculated according to the following equation and consistent units:

$$\epsilon = \frac{E}{tc}$$

where $\epsilon$ = extinction coefficient (liters-mols⁻¹-microns⁻¹); $E$ = extinction ($\log I_0/I$); $t$ = path length (microns); and $c$ = concentration (mols double bond/liter). The extinction was determined at the 10.35 micron band, and the extinction coefficient used was $1.21 \times 10^{-2}$ (liters-mols⁻¹-microns⁻¹).

The percent of the total unsaturation present as 1,2- (or vinyl) was calculated according to the above equation, using the 11.0 micron band and an extinction coefficient of $1.52 \times 10^{-2}$ (liters-mols⁻¹-microns⁻¹).

The percent of the total unsaturation present as cis 1,4- was obtained by subtracting the trans 1,4- and 1,2- (vinyl) determined according to the above methods from the theoretical unsaturation assuming one double bond for each C₄ unit in the polymer.

In the runs in which isoprene polymers were analyzed by infrared transmission, the extinction coefficient was obtained from an infrared spectrum of a carbon disulfide solution of purified balata. The sample of balata was assumed to contain 100 percent trans 1,4-addition. The comparison between the balata sample and the isoprene polymers of this invention was determined at the 8.7 micron band. The results of these runs are presented hereinbelow in Table IV.

TABLE IV

| Run No. | Polymer | Example—Recipe ¹ | Mol Ratio LiAlH₄/TTI | TTI Parts by weight | TTI Mmole | LiAlH₄ Parts by weight | LiAlH₄ Mmole | Trans 1,4 | 1,2 | Cis 1,4 |
|---|---|---|---|---|---|---|---|---|---|---|
| 2 | 1,3-butadiene | I—A | 0.86 | 5.7 | 10.3 | 0.334 | 8.8 | 82 | 3.0 | 15 |
| 6 | do | I—A | 1.31 | 5.6 | 10.1 | 0.502 | 13.2 | 86.5 | 4.5 | 9 |
| 32 | do | II—C | 1.2 | 5.5 | 10.0 | 0.456 | 12.0 | 78.5 | 9.5 | 12 |
| 38 | Isoprene | III—A | 1.2 | 1.64 | 3.0 | 0.137 | 3.6 | 80 | | |
| 41 | do | III—A | 1.4 | 1.63 | 3.0 | 0.16 | 4.2 | 90 | | |
| 44 | do | III—A | 1.6 | 1.66 | 3.0 | 0.182 | 4.8 | 81 | | |
| 46 | do | III—A | 1.8 | 1.68 | 3.0 | 0.205 | 5.4 | 76 | | |
| 47 | do | III—A | 1.8 | 1.65 | 3.0 | 0.205 | 5.4 | 77 | | |
| 48 | do | III—A | 2.0 | 1.64 | 3.0 | 0.228 | 6.0 | 84 | | |
| 49 | do | III—A | 2.2 | 1.62 | 3.0 | 0.251 | 6.6 | 89 | | |
| 50 | do | III—A | 2.4 | 1.67 | 3.0 | 0.274 | 7.2 | 88 | | |
| 51 | do | III—A | 2.5 | 1.65 | 3.0 | 0.285 | 7.5 | 80 | | |
| 52 | do | III—A | 3.0 | 1.62 | 3.0 | 0.342 | 9.0 | 83 | | |

¹ The Roman numeral designates the previous example in which the particular run is described while the letter indicates which recipe of that example was used in making the polymer.
² In the infrared analyses of polyisoprene, only the percent of trans 1,4-addition was measured, the balance being 3,4-; 1,2- (vinyl) and cis 1,4-addition, of which a major proportion was 3,4-addition. Based on qualitative indications.

EXAMPLE V

A sample of the polybutadiene rubber of Example II and several samples of the polyisoprene rubber of Example III, all of which were produced by the process of this invention, were analyzed to determine their "no-strength" temperature.

In this test, 5 grams of the polybutadiene rubber was pressed between two photographic plates to form a sheet of rubber approximately 5 mils thick. A section one-inch long and one-fourth inch wide was then cut out of this sheet, and this 1″ x ¼″ x 5 mil sample was then tested.

In the case of the polyisoprene, a sample of approximately 1″ x ¼″ x 5 mils diversion was sliced from a larger solid piece of the rubber. Two samples of purified balata were also selected for testing, one of which was formed into a test sample of 1″ x ¼″ x 5 mil dimensions by the method employed for the polybutadiene. The other balata test sample was formed by the same method used for the polyisoprene.

The test which was used to determine the "no-strength" temperature was carried out by the following procedure. The sample was placed in a zone in which the temperature could be regulated, and a 24 gram weight was suspended from the sample. The top of the weight was then lined up with a mark on the side of the vessel in which the sample was placed, after which the temperature within the vessel was raised at a rate of not more than 5° F. per minute. The "no-strength" temperature was then recorded as the temperature at which the sample broke, or the temperature at which the top of the weight passed a mark located one-inch below the mark with which the weight was originally aligned.

The results of these tests are presented below in Table V.

TABLE V

| Run No. | Example—Recipe[1] | Polymer of— | "No-strength" temperature ° F. |
|---|---|---|---|
| 31 | I—B | 1, 3-butadiene | 118 |
| 35 | III—A | Isoprene | 98 |
| 37 | III—A | ___do___ | 91 |
| 40 | III—A | ___do___ | 94 |
| 42 | III—A | ___do___ | 91 |
| Control | | Balata (pressed) | 108 |
| Do | | Balata (sliced) | 135 |

[1] The Roman numeral designates the previous example in which the particular run is described while the letter indicates which recipe of that example was used in making the polymer.

EXAMPLE VI

The blend of polymers from runs 3, 4, and 5 was compounded with compounding ingredients and evaluated by standard rubber tests. The Mooney viscosity (ML–4) of this blend prior to compounding was 52.9. This blend of polymer was compounded according to the following compounding recipe:

Recipe

| | Parts by weight |
|---|---|
| Polymer | 100 |
| Carbon black (Philblack "O")[1] | 50 |
| Zinc oxide | 3.0 |
| Stearic acid | 4.0 |
| Flexamine[2] | 1.0 |
| Sulfur | 2.0 |
| Santocure[3] | 1.0 |

[1] High abrasion carbon black.
[2] Physical mixture containing 65 percent of a complex diarylamine-ketone reaction product and 35 percent of N,N′-diphenyl-p-phenylenediamine.
[3] N-cyclohexyl-2-benzothiazylsulfenamide.

The compounded rubber was then cured for 30 minutes at 307° F.

This compounded rubber was compared with a polybutadiene rubber which had been prepared by emulsion polymerization at −20° C. (−4° F.) employing 2-(4-methoxybenzenediazomercapto)-naphthalene-potassium ferricyanide as the activator. This emulsion-polymerized rubber was then compounded according to the following recipe. The Mooney viscosity (ML–4) of this emulsion-polymerized polymer, prior to compounding, was 67.

Recipe

| | Parts by weight |
|---|---|
| Polybutadiene | 100 |
| Carbon black (Philblack "O")[1] | 50 |
| Zinc oxide | 3.0 |
| Asphalt | 10 |
| Rosin acid | 2 |
| Stearic acid | 2 |
| Sulfur | 1.75 |
| Santocure[1] | 0.8 |

[1] See footnotes to previous compounding recipe.

The emulsion-polymerized polybutadiene, compounded according to the above recipe, was then cured for 30 minutes at 307° F.

The physical properties of both the polybutadiene which had been prepared by an organometal-catalyzed polymerization (LiAlH$_4$ and titanium tetraiodide) and the polybutadiene which had been prepared by emulsion polymerization at −20° C. (−4° F.) were determined. These properties are presented below in Table VI.

TABLE VI

| | Polybutadiene from organometal-catalyzed polymerization | Polybutadiene from emulsion-polymerization |
|---|---|---|
| Tensile strength, p.s.i | 3,200 | 3,070 |
| 300% modulus, p.s.i | 1,580 | 1,110 |
| Elongation, percent | 560 | 525 |
| Heat build-up, ° F | 86.8 | 84 |
| Resilience, percent | 68.2 | 65 |
| Shore hardness ("A") | 73 | 62 |

The polybutadiene prepared according to the instant invention and used in this example had about 80 percent trans 1,4-addition and about 5 percent 1,2-addition. As described in the literature, polybutadiene prepared at −20° C. in an emulsion system in the presence of a free radical catalyst has about 75 percent trans 1,4-addition and about 15 percent 1,2-addition.

The rubbery polymers produced in accordance with this invention have utility in applications where natural and synthetic rubbers are used. They can be used in the manufacture of automobile tires and other rubber articles, such as gaskets, tubing, covering for wire and cable, rubber heels, and rubber tile.

As will be evident to those skilled in the art, many variations and modifications can be practiced which fall within the scope of this invention. The invention resides in novel polymers of 1,3-butadiene and isoprene and in a process for producing these polymers by polymerizing one of the aforementioned monomers in the presence of a catalyst composition comprising (a) a complex aluminum hydride of lithium, sodium, potassium, rubidium, and cesium, and (b) titanium tetraiodide.

We claim:

1. A method for polymerizing a monomer selected from the group consisting of 1,3-butadiene and isoprene which comprises contacting said monomer under polymerization conditions with a catalyst comprising (a) a complex aluminum hydride corresponding to the formula MAlH$_4$, wherein M is selected from the group consisting of lithium, sodium, potassium, rubidium and cesium, and (b) titanium tetraiodide.

2. A method in accordance with claim 1 wherein said catalyst consists essentially of lithium aluminum hydride and titanium tetraiodide.

3. A method in accordance with claim 1 wherein said catalyst consists essentially of sodium aluminum hydride and titanium tetraiodide.

4. A method in accordance with claim 1 wherein said catalyst consists essentially of potassium aluminum hydride and titanium tetraiodide.

5. A method in accordance with claim 1 wherein said catalyst consists essentially of rubidium aluminum hydride and titanium tetraiodide.

6. A method in accordance with claim 1 wherein said catalyst consists essentially of cesium aluminum hydride and titanium tetraiodide.

7. A method for producing a rubbery polymer of a conjugated diene selected from the group consisting of 1,3-butadiene and isoprene which comprises contacting said conjugated diene under polymerization conditions with a catalyst formed from materials consisting essentially of (a) a complex aluminum hydride corresponding to the formula $MAlH_4$, wherein M is selected from the group consisting of lithium, sodium, potassium, rubidium and cesium, and (b) titanium tetraiodide, in the presence of a diluent, inert and liquid under conditions of the method, and recovering the rubbery polymer so produced.

8. A method in accordance with claim 7 wherein 1,3-butadiene is contacted with a catalyst consisting essentially of lithium aluminum hydride and titanium tetraiodide at a temperature in the range of zero to 150° C. and at a pressure sufficient to maintain said 1,3-butadiene in the liquid phase.

9. A method in accordance with claim 7 wherein isoprene is contacted with a catalyst consisting essentially of lithium aluminum hydride and titanium tetraiodide at a temperature in the range of zero to 150° C. and at a pressure sufficient to maintain said isoprene in the liquid phase.

10. A method in accordance with claim 7 wherein the ratio of the amount of said complex aluminum hydride and said titanium tetraiodide in said catalyst is in the range of 0.5 to 6.0 mols of said hydride per mol of said titanium tetraiodide.

11. A method in accordance with claim 7 wherein the ratio of the amount of said complex aluminum hydride and said titanium tetraiodide in said catalyst is in the range of 1.3 to 3.0 mols of said hydride per mol of said titanium tetraiodide.

12. A method for producing a rubbery polymer of 1,3-butadiene which comprises contacting 1,3-butadiene with a catalyst consisting essentially of a mixture of 1.3 to 3.0 mols of lithium aluminum hydride per mol of titanium tetraiodide in the presence of a hydrocarbon diluent, at a temperature in the range of 10° C. to 80° C., and at a pressure sufficient to maintain the reaction mixture substantially in liquid phase, and recovering the polymer so produced.

13. A method for producing a rubbery polymer of isoprene which comprises contacting isoprene with a catalyst consisting essentially of a mixture of 1.3 to 3.0 mols of lithium aluminum hydride per mol of titanium tetraiodide in the presence of a hydrocarbon diluent, at a temperature in the range of 10° C. to 80° C. and a pressure sufficient to maintain the reaction mixture substantially in liquid phase, and recovering the polymer so produced.

14. A method for producing a rubbery polymer of a conjugated diene selected from the group consisting of 1,3-butadiene and isoprene which comprises introducing into a reaction zone a hydrocarbon diluent and a catalyst consisting essentially of lithium aluminum hydride and titanium tetraiodide; passing said conjugated diene into said reaction zone and contacting same with said catalyst; maintaining said reaction zone at a temperature in the range of zero to 150° C. and at a pressure sufficient to keep the reaction mixture substantially in liquid phase; and recovering the polymer so produced.

15. A method in accordance with claim 14 in which said catalyst in said diluent is aged prior to the introduction of said conjugated diene into said reaction zone by maintaining said catalyst in said diluent at a temperature in the range of about 30 to 100° C. for a period of from about 10 minutes to 24 hours.

16. A method in accordance with claim 14 wherein said lithium aluminum hydride is added to a solvent prior to its introduction into said reaction zone.

17. A method in accordance with claim 16 in which said solvent is an ether.

References Cited in the file of this patent

UNITED STATES PATENTS

| | | |
|---|---|---|
| 1,058,056 | Harries | Apr. 8, 1913 |
| 2,699,457 | Ziegler et al. | Jan. 11, 1955 |
| 2,721,189 | Anderson et al. | Oct. 18, 1955 |
| 2,726,231 | Field et al. | Dec. 6, 1955 |
| 2,832,759 | Nowlin et al. | Apr. 29, 1958 |

FOREIGN PATENTS

| | | |
|---|---|---|
| 538,782 | Belgium | Dec. 6, 1955 |

OTHER REFERENCES

Binder: I. and E. Chem., vol. 46, No. 8, August 1954, pp. 1727–30.